April 8, 1952     T. SENDZIMIR     2,591,730
COLLAPSIBLE TENSION-WINDER OR REEL FOR STRIP MATERIAL
Filed Jan. 30, 1950     7 Sheets-Sheet 2

INVENTOR.
Tadeusz Sendzimir
BY
Seymour, Carle & Nichols
Attorneys

April 8, 1952 T. SENDZIMIR 2,591,730
COLLAPSIBLE TENSION-WINDER OR REEL FOR STRIP MATERIAL
Filed Jan. 30, 1950 7 Sheets-Sheet 3

INVENTOR.
Tadeusz Sendzimir
BY
Seymour, Carle & Nichols
Attorneys

April 8, 1952  T. SENDZIMIR  2,591,730

COLLAPSIBLE TENSION-WINDER OR REEL FOR STRIP MATERIAL

Filed Jan. 30, 1950  7 Sheets-Sheet 4

INVENTOR.
Tadeusz Sendzimir
BY
Seymour, Earle & Nichols
Attorneys

April 8, 1952     T. SENDZIMIR     2,591,730
COLLAPSIBLE TENSION-WINDER OR REEL FOR STRIP MATERIAL
Filed Jan. 30, 1950     7 Sheets-Sheet 6

INVENTOR
Tadeusz Sendzimir
BY
Seymour, Earle + Nichols
Attorneys

April 8, 1952   T. SENDZIMIR   2,591,730
COLLAPSIBLE TENSION-WINDER OR REEL FOR STRIP MATERIAL
Filed Jan. 30, 1950   7 Sheets-Sheet 7

INVENTOR
Tadeusz Sendzimir
BY Seymour, Carle + Nichols
Attorneys

Patented Apr. 8, 1952

2,591,730

UNITED STATES PATENT OFFICE 2,591,730

COLLAPSIBLE TENSION-WINDER OR REEL FOR STRIP MATERIAL

Tadeusz Sendzimir, Middletown, Ohio, assignor to Armzen Company, Incorporated, Waterbury, Conn., a corporation of Delaware Application January 30, 1950, Serial No. 141,240

17 Claims. (Cl. 242—72)

The present invention relates to winders or drums on which strip material and the like may be wound under high tension, and which winders or reels may be collapsed to permit the ready removal of the bundle of wound material therefrom.

It may here be noted that in many industries it is necessary, for economic reasons, to wind as much material on a single drum or reel as is possible, with the result that the reel or drum is forced to carry a very large weight of material and is, therefore, subject to great bending or flexural stresses.

Furthermore, in many industries it is necessary to utilize the drum or reel as a tension-winder to exert great tensile pull upon the material being wound, in order to assist the reduction of the thickness of such material as, for instance, when used in conjunction with a metal rolling mill. Such utilization causes tremendous compressive strains upon the collapsible shoes or segments of the winder, with the result that it is difficult to assure the necessary uniformity in function of the actuating-means for effecting the collapse of the winder or drum. Other difficult conditions under which it is desirable to use collapsible tension-winders or reels are well known in the art and have long had the attention of skilled persons endeavoring to minimize difficulties and defects in the construction of collapsible tension-winders or reels.

One of the main objects of the present invention is to provide a collapsible tension-winder or drum having a superior construction and arrangement of parts whereby it effectively resists high stresses and functions in a smooth and reliable manner.

Another object of the present invention is to provide a superior collapsible tension-winder or drum of the character above referred to and capable of reliably functioning when supporting at only one end, to thereby provide a structure from which a roll or bundle of material may be readily removed.

A further object of the present invention is to provide a collapsible tension-winder or drum having a superior construction and arrangement of parts whereby there is assured the uniform retirement of its collapsible shoes despite the structure being subjected to very high stresses.

Still another object of the invention is to provide a superior collapsible tension-winder having simple, reliable and effective means for gripping the end of a strip or the like preparatory to the winding operation.

Other objects and advantages will appear to those skilled in the art from the following, considered in conjunction with the accompanying drawings.

In the accompanying drawings, in which certain modes of carrying out the present invention are shown for illustrative purposes.

*The showing of Figs. 1 to 8 inclusive*

The tension-winder or reel illustrated in Figs. 1 to 8 inclusive, comprises a drive-shaft 20 having an axial passage 21 extending therethrough, in which is adapted to reciprocate an actuating-rod 22. The said drive-shaft is supported in spaced-apart roller bearings or other suitable antifriction bearings 23 and 24 which, in turn, are respectively mounted in the inner and outer portions of a frame or housing 25, through which the inner portion of the drive-shaft 20 extends, as is especially well shown in Fig. 1.

Figures 1, 2, 11:
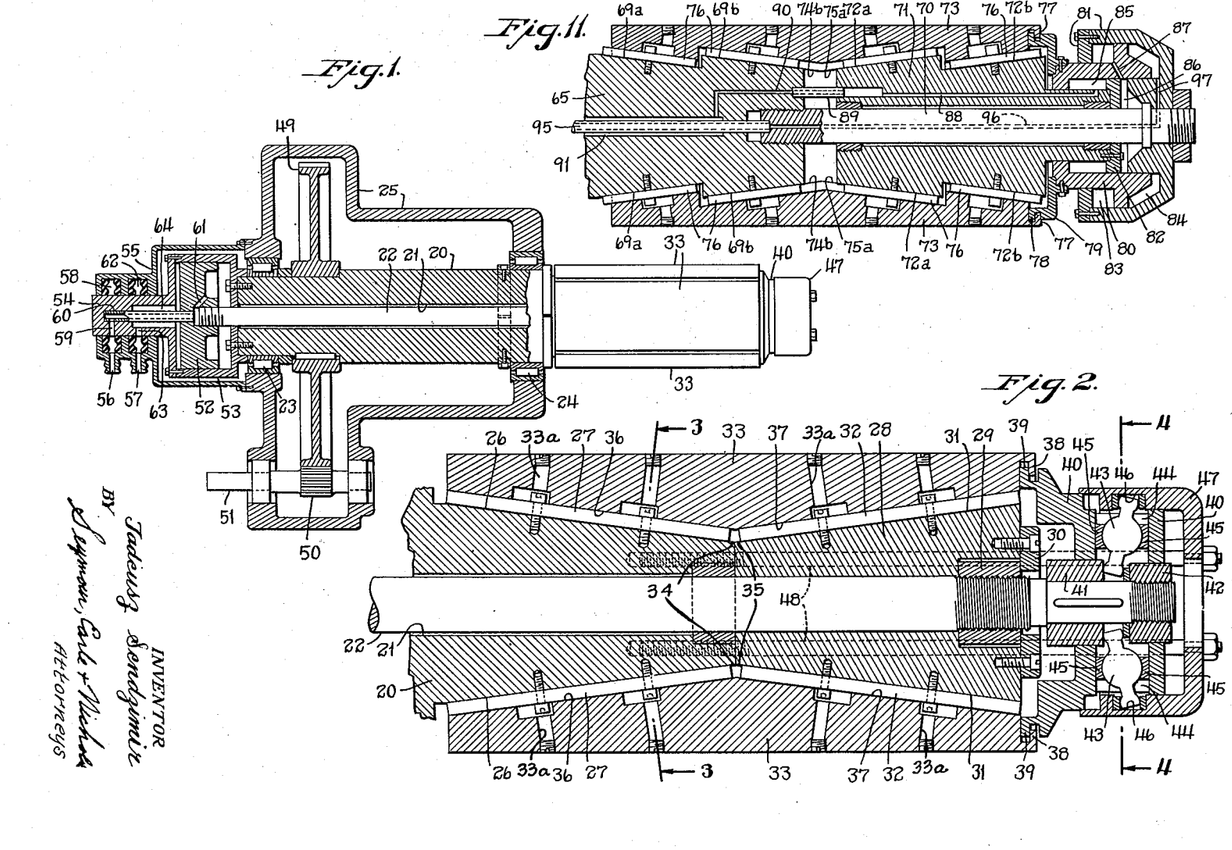
Fig. 1 is a view mainly in central-longitudinal section and partly in side elevation of one form which a tension-winder may assume in accordance with the present invention and with the gripping-shoes in their expanded positions.
Fig. 2 is a broken central-longitudinal sectional view of the outer end of the drive-shaft and the parts organized therewith, but on a larger scale than Fig. 1, and also showing the gripping-shoes in their expanded positions.
Fig. 11 is a view corresponding to though slightly less comprehensive than Fig. 10, but showing the parts in the positions which they assume when the gripping-shoes are collapsed.

The outer end of the drive-shaft 20 projects beyond the outer portion of the frame 25 and the roller bearing 24 and is tapered as shown, and provided with four (more or less) similar outwardly-facing cam-surfaces 26 which slope in a direction lengthwise of the said drive-shaft and converge inwardly toward the outer end thereof. Secured subtantially centrally on each of the cam-surfaces 26 is one of four similar dovetail-ribs 27 also extending substantially longitudinally of the said drive-shaft.

Figure 8:
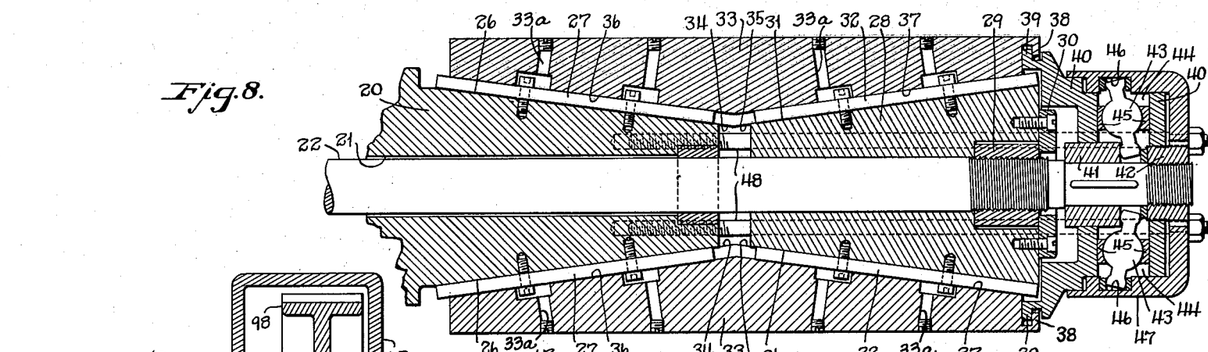
Fig. 8 is a longitudinal sectional view similar to Fig. 2, but showing the gripping-shoes collapsed.

Located adjacent the outer end of the drive-shaft 20 and adjustably mounted on the outer portion of the actuating-rod 22 is a control-member 28. The said control-member is secured to the actuating-rod 22 by means of an adjusting-nut 29 recessed into the outer end of the control-member 28 and threaded onto the adjacent portion of the said adjusting-rod, as is shown in Figs. 2 and 8. The said adjusting-nut 29 is, in turn, coupled to the control-member by means of a retaining-plate 30.

The control-member 28 tapers inwardly toward the outer end of the drive-shaft 20 and is provided with four (more or less) similar outwardly-facing cam-surfaces 31 which slope in a direction longitudinally of the drive-shaft in registration with and in opposition to the slope of the cam-surfaces 26 previously referred to. Secured substantially centrally on each of the cam-surfaces 31 is one of four similar dovetail-ribs 32 also extending longitudinally of the drive-shaft 20 and preferably registering with the dovetail-ribs 27 on the previously-described cam-surfaces 26 of the drive-shaft 20.

Mounted jointly on the outer end of the drive-shaft 20 and the control-member 28 are four (more or less) similar gripping-shoes 33. Each of the said gripping-shoes is provided (Fig. 6) on its inner face with two oppositely-sloping cam-surfaces 34 and 35 respectively conforming to and slidably engaging with one of the cam-surfaces 26 of the drive-shaft 20 and the aligned one of the cam-surfaces 31 of the control-member 28. The cam-surfaces 34 and 35 of a given gripping-shoe 33 are respectively formed with dovetail-grooves 36 and 37 respectively interfitting with the dovetail-ribs 27 and 32 previously described, to effect the coupling of the said gripping-shoes to both the drive-shaft 20 and the control member 28.

It may here be explained that each of the gripping-shoes 33 is provided, as shown (Figs. 2 and 8), with radial openings 33a in order that the dovetail-ribs 27 and 32 may be attached respectively to the cam-surfaces 26 and 31 after the said dovetail-ribs have been installed respectively in the dovetail-grooves 36 and 37, and after the gripping-shoes 33 have been positioned over the various cam-surfaces 26 and 31. This procedure is necessary in view of the particular construction here being considered, since the reverse slopes of the cam-surfaces 26 and 31 respectively will not permit the pre-assembly of the ribs 27 and 32 with either the drive-shaft 20 or the control-member 28.

The four (more or less) gripping-shoes 33 above described serve to jointly provide a coil-receiving surface for the drive-shaft 20. In its outer end, each gripping-shoe 33 is provided with an arcuate coupling-rib 38 projecting inwardly toward the actuating-rod 22 and extending over an annular coupling-rib 39 projecting radially outwardly from an actuating-head 40.

The actuating-head 40 above referred to has movement in an axial direction with respect to the drive-shaft 20, actuating-rod 22 and control-member 28, and bears partly upon the outer periphery of a sleeve 41 and a retaining-nut 42, as is especially well shown in Figs. 2 and 8. The sleeve 41 is rigidly mounted upon the reduced outer portion of the actuating-rod 22 and, spaced outwardly therefrom is the said retaining-nut 42 which is threadedly connected to the extreme outer portion of the said actuating-rod. Fitting between the sleeve 41 and the retaining-nut 42 are the cylindrically-contoured inner ends of four (more or less) actuating-levers 43 respectively extending substantially radially in a similar number of radial passages 44 formed in the actuating-head 40, as is especially well shown in Fig. 4. The central portion of each of the actuating-levers is also cylindrically contoured and is pivotally mounted in the given one of the said passages 44 by means of two oppositely-facing bearing-shoes 45—45 as is especially well shown in Figs. 2 and 8. As shown, the respective inner faces of a given pair of bearing-shoes 45—45 are conformed to the curvature of the cylindrically-contoured central portion of the adjacent actuating-lever 43.

The respective outer ends of each of the actuating-levers 43 above referred to are also cylindrically contoured, and respectively extend into one of four similar inwardly-opening recesses 46 (Fig. 4) formed in the interior of a cup-shaped retaining-head 47. The said retaining-head is fixedly coupled to the outer end of the drive-shaft 20 by means of four (more or less) tie-rods 48 grouped around the actuating-rod 22 in parallelism therewith and having their inner ends threaded into the outer end of the drive-shaft 20 as is indicated in Figs. 2 and 8. The outer ends of the said tie-rods 48 are rigidly secured to the cup-shaped retaining-head 47.

From the foregoing, it will be apparent that when the actuating-rod 22 is reciprocated with respect to the drive-shaft 20, it will rock the actuating-levers 43 about their outer ends as fulcrums within the fixed retaining-head 47. This rocking movement of the levers 43 will shift the gripping-shoes 33 in an axial direction a distance corresponding to one-half the distance (in the instance shown), through which the actuating-rod 22 and its attached control-member 28 are moved—all for purposes as will more fully hereinafter appear.

The drive-shaft 20 may be driven in any suitable manner, and in the present instance there is illustrated in Fig. 1 a drive-gear 49 mounted within the frame or housing 25 and rigidly keyed to the said drive-shaft 20. Meshing into the drive-gear 49 is a drive-pinion 50 forming part of a shaft 51 journaled in the frame or casing 25 and adapted to be connected to any suitable source of power.

The actuating-rod 22 or its equivalent may be reciprocated by any suitable means for effecting the expansion and collapsing of the gripping-shoes 33, and for purposes of illustration in the present instance, there is shown (Fig. 1) as threaded onto the end of the said actuating-rod remote from the gripping-shoes 33, a piston 52. The said piston is adapted to reciprocate within a cylinder 53 rigidly attached to the inner end of the drive-shaft 20 and rotatable therewith. The cylinder 53 is provided with a neck 54 projecting axially away from the inner end of the drive-shaft 20 and rotatable in the reduced-diameter outer portion of a fluid-connecting member 55 rigidly attached to the inner portion of the frame or housing 25 previously described.

The fluid-connecting member 55 is provided with two radial fluid-passages 56 and 57 which are adapted to be connected in any suitable manner to a source of fluid under pressure. The fluid-passage 56 communicates with an annular fluid-chamber 58 formed in the outer portion of the member 55 which, in turn, communicates with a radial passage 59 in the neck 54. The inner end of the passage 59 just referred to communicates with the end of a tube 60 secured coaxially within the neck 54 of the cylinder 53 and extending axially with a sliding fit into the piston 52, as is indicated in Fig. 1. The inner end of the tube 60 is in communication with the portion of the cylinder 53 to the right of the piston 52 by means of an inclined passage 61.

The radial fluid-passage 57 of the fluid-connecting member 55 previously described, communicates with an annular fluid-chamber 62 formed in the outer portion of the said member 55 just inwardly of the fluid-chamber 58. The fluid-chamber 62 is in communication with a radial passage 63 formed in the neck 54 of the cylinder 53. The said passage 63 is also in communication with an axial chamber 64 formed in the neck 54 around the tube 60 therein. The inner end of the chamber 64 communicates with the portion of the cylinder 53 to the left of the piston 52, as is indicated in Fig. 1.

It will be obvious from the foregoing that when the parts are in the positions in which they are shown in Figs. 1 and 2 (with the gripping-shoes 33 expanded), that if fluid under pressure is supplied to the radial fluid-passage 57 in the fluid-connecting member 55 (while the radial passage 56 is properly vented), the piston 52 and the parts connected thereto will be moved from left to right (as viewed in the drawings), to thereby effect the collapse of the gripping-shoes 33 into the positions in which they are indicated in Fig. 8. Conversely, if fluid under pressure is now supplied to the radial fluid-passage 56 in the member 55 (while the radial passage 57 is properly vented), fluid under pressure will be supplied to the right portion of the cylinder 53, with the result that the piston 52 and the parts connected thereto will be moved from right to left, with the effect of expanding the gripping-shoes 33.

It will be apparent from the foregoing that when the actuating-rod 22 is moved from left to right from the position in which it is shown in Fig. 2, the control-member 28 will be similarly moved to the same extent, thereby sliding the cam-surfaces 31 of the said control-member outwardly with respect to the internal cam-surfaces 35 of the gripping-shoes 33. This action will relieve the outer portions of the gripping-shoes 33 from support and permit them to collapse radially inwardly, provided the left cam-surfaces 34 of the gripping-shoes 33 are moved with respect to the cam-surfaces 26 on the drive-shaft 20 to a corresponding degree. To insure the movement last referred to and thus insure the collapse of the gripping-shoes 33, the said gripping-shoes 33, coincidentally with the movement of the control-member 28 as above described, will also be moved in an axial direction through the intermediary of the actuating-levers 43, but to only half the extent to which the said control-member has been moved, all as indicated in Fig. 8.

Figures 5, 6, 7, 9:
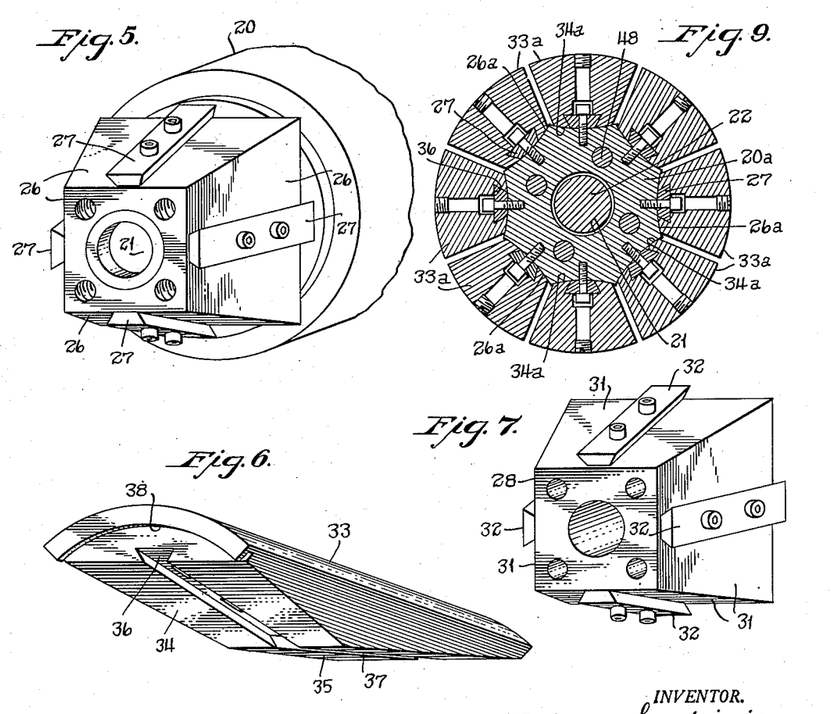
Fig. 5 is a broken perspective view of the drive-shaft looking toward the outer end thereof.
Fig. 6 is a perspective view of one of the gripping-shoes, detached.
Fig. 7 is a perspective view of the actuating-head looking mainly toward the inner end thereof.
Fig. 9 is a transverse sectional view similar to Fig. 3, but showing another form of the present invention.

*The showing of Fig. 9*

Figure 3:
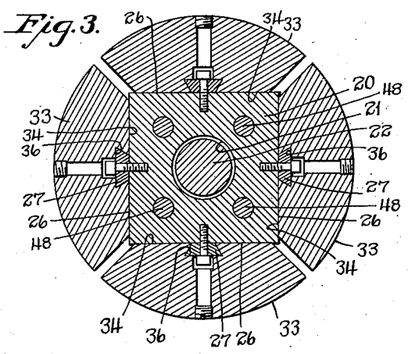
Fig. 3 is a transverse sectional view taken on the line 3—3 of Fig. 2.
Figure 4:
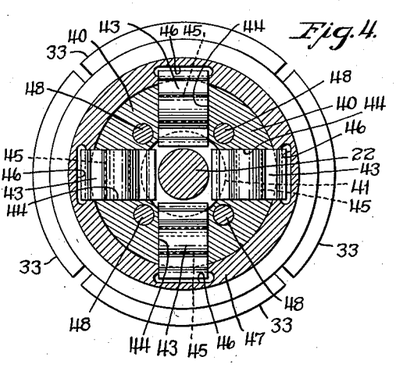
Fig. 4 is a similar view taken on the line 4—4 of Fig. 2.

Fig. 9 is a view similar to Fig. 3, save that it illustrates a slightly modified form of the present invention. In Fig. 9 the drive-shaft 20a is in all major respects the same as the previously described drive-shaft 20, save that it is provided upon its periphery with eight concave cylindrically-contoured cam-surfaces 26a which function similarly to the cam-surfaces 26 previously described. Respectfully engaging with the cam-surfaces 26a are convex cylindrically-contoured cam-surfaces 34a, one of which is formed on the inner face of each of eight gripping-shoes 33a functioning in the same manner as has been described in connection with the gripping-shoes 33.

The gripping-shoes 33a may be collapsed in the same manner as has been previously described in connection with the showing of Figs. 1 to 8 inclusive, and the showing of Fig. 9 is intended to indicate a structure wherein the details are slightly varied to provide an even more uniform collapsing and expanding action than is available with the structure of Figs. 1 to 8 inclusive.

Figure 10:
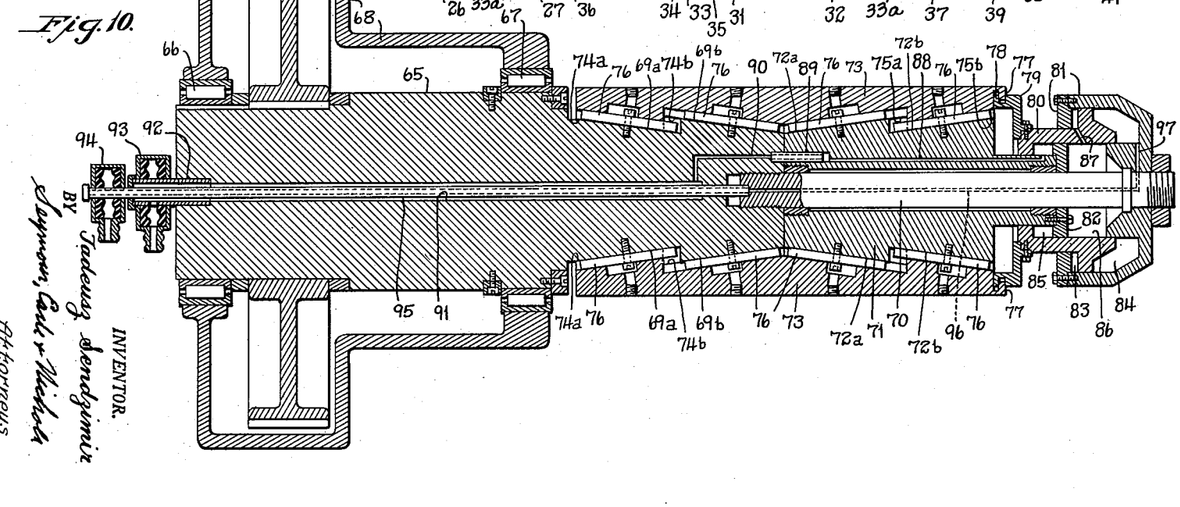
Fig. 10 is a view in central-longitudinal section of still another form which the present invention may assume and with the gripping-shoes in their expanded positions.

The showing of Figs. 10 and 11

In the showing of Figs. 1 to 8 inclusive, actuating-levers 43 were employed to insure that the gripping-shoes 33 would be positively moved in an axial direction a fractional part of the movement imparted to the control-member 28 or its equivalent. The showing of Figs. 10 and 11 employs hydraulic means for achieving the proportioned equivalent movement just above referred to, all as will be presently described.

In Fig. 10 there is shown a drive-shaft 65 supported in suitable antifriction bearings 66 and 67 carried in a frame or housing 68.

The drive-shaft 65 projects beyond the bearing 67 and the adjacent end of the frame or housing 68, and is there provided upon its periphery with a plurality of pairs of outwardly-facing cam-surfaces 69a—69b which slope in a direction lengthwise of the said drive-shaft, and converge inwardly toward the outer end of the latter.

Rigidly attached to and extending axially outwardly from the outer end of the drive-shaft 65 is a tie-rod 70. Mounted upon the tie-rod 70 with capacity for axial sliding movement thereon is a control-member 71. The said control-member is provided upon its outer periphery with a plurality of pairs of outwardly-facing cam-surfaces 72a—72b, perferably corresponding in number to the number of pairs of cam-surfaces 69a—69b previously described. The said cam-surfaces 72a—72b slope in a direction longitudinally of the drive-shaft in opposition to the slope of the cam-surfaces 69a—69b as is indicated in Figs. 10 and 11.

Surrounding the tapered outer end of the drive-shaft 65 and the control-member 71 is a plurality of gripping-shoes 73. Each of the said gripping-shoes is provided on its inner face with two pairs of cam-surfaces 74a—74b and 75a—75b, respectively conforming to and slidably engaging with the cam-surfaces 69a—69b of the drive-shaft 65 and the cam-surfaces 72a—72b of the control-member 71.

Each of the cam-surfaces 69a—69b and 72a—72b have centrally secured to them one of a number of longitudinal retaining-ribs 76 functioning in the same manner as the previously-described dovetail-ribs 27 and 32, and serving to retain the gripping-shoes 73 in place, while permitting the relative longitudinal movement of the latter with respect to both the drive-shaft 65 and the control-member 71.

Each gripping-shoe 73 is provided at its outer end with an inwardly-projecting coupling-rib 77 extending over a coupling-rib 78 projecting radially outwardly from an actuating-ring 79. The said actuating-ring forms part of the inner portion of a tubular outer piston 80 which is adapted to reciprocate within a cylinder 81. Axially movable within the tubular piston 80 is a plate-like inner piston 82 rigidly attached to the reduced outer end of the control-member 71. In combination, the outer piston 80, the cylinder 81 and the inner piston 82 provide four chambers 83, 84, 85 and 86.

The tubular piston 80 is provided with a diagonal passage 87 serving to provide communication between the chamber 83 and the chamber 86. Communicating at its outer end with the chamber 85, is a fluid-passage 88 formed in the control-member 71 and telescopically receiving in its enlarged inner end a tube 89 which is rigidly seated in the outer end of the drive-shaft 65. Communicating with the inner end of the tube 89 is a fluid-passage 90 formed in the outer portion of the drive-shaft 65 and communicating at its inner end with an axial fluid-passage 91 also formed in the said drive-shaft. The left end (as viewed in Figs. 10 and 11) of the fluid-passage 91 is in communication with a tube 92 rigidly carried by the drive-shaft 61, and having mounted upon it with capacity for relative rotation a fluid-connecting member 93. The said fluid-connecting member is adapted to be connected to a source of fluid under pressure for purposes as will hereinafter appear.

Located to the left (as viewed in Figs. 10 and 11) of the fluid-connecting member 93 is another fluid-connecting member 94 also adapted to be connected to a source of fluid under pressure, and mounted with freedom for relative rotation upon the outer end of a tube 95. The interior of the member 94 is in communication with the interior of the tube 95, which latter extends centrally through the axial fluid-passage 91 in the drive-shaft 65. The right end of the tube 95 is connected in a fluid-tight manner to the inner end of an axial fluid-passage 96 extending through the tie-rod 70 and communicating at its outer end with a radial fluid-passage 97 formed in the outer portion of the cylinder 81 and communicating with the chamber 84 in the latter.

The drive-shaft 65 and the parts carried thereby may be turned in any suitable manner such, for instance, as by means of a drive-gear 98 keyed or otherwise rigidly secured to the said drive-shaft at a location within the frame or housing 68 as is indicated in Fig. 10. Any suitable source of power may be connected to the drive-gear 98.

Let it be assumed, for purposes of description, that the parts are in the positions in which they are indicated in Fig. 10, in which event, the gripping-shoes 73 are in their expanded positions. Now, let it be assumed that it is desired to collapse the gripping-shoes 73 inwardly to release a bundle of sheet metal or the like. To accomplish this object, the fluid-connecting member 94 may be vented to permit the escape of fluid therefrom, and fluid under pressure may be admitted into the fluid-connecting member 93 thereby creating pressure in the chamber 85 within the tubular piston 80, thus tending to shift the plate-like inner piston 82 to the right. The movement of the piston 82 will force fluid to flow from the chamber 86 through the diagonal fluid-passage 87 into the chamber 83 within the cylinder 81 which latter, as previously described, is held rigid with the drive-shaft 65 by means of the tie-rod 70. Now, inasmuch as the cross-sectional area of the chamber 83 in the cylinder 81 is much greater than the cross-sectional area of the chamber 86 within the tubular piston 80, the displaced fluid will simultaneously force the said tubular piston from left to right and thus similarly shift the gripping-shoes 73. The movement imparted to the control-member 71 will be materially in excess of the movement imparted to the gripping-shoes 73 and the parts at the conclusion of the operation just described, will assume the positions in which they are indicated in Fig. 11.

To restore the parts back into the positions in which they are shown in Fig. 10, fluid under pressure will be introduced into the fluid-connecting member 94, while the companion fluid-connecting member 93 is permitted to have fluid escape therefrom.

The showing of Figs. 12 to 17 inclusive

Figure 12:
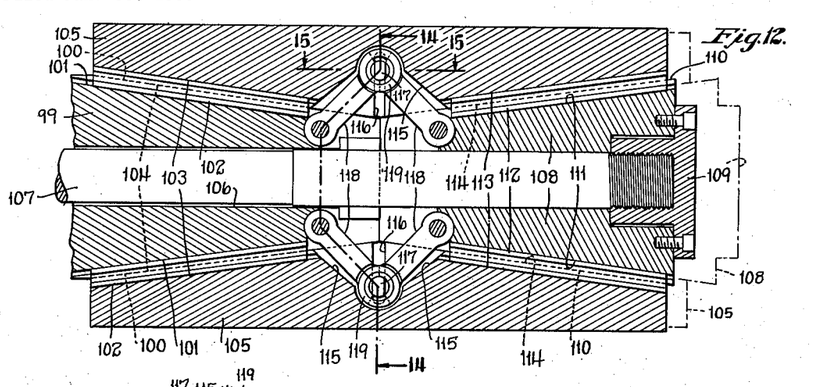
Fig. 12 is a broken view in central-longitudinal section of still another form which the present invention may assume.
Figure 13:
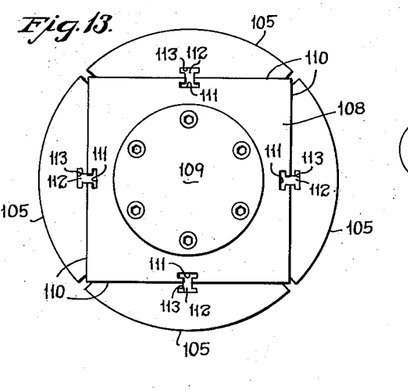
Fig. 13 is a view looking toward the outer end of the structure of Fig. 12.

The structure now being described includes a drive-shaft 99 having four (more or less) similar outwardly-facing cam-surfaces 100 which slope in a direction lengthwise of the said drive-shaft and converge inwardly toward the outer end thereof. Formed substantially centrally in each of the cam-surfaces 100 is one of four similar T-shaped grooves 101, each of which receives the inner portion of one of four similar I-shaped guide-bars or -keys 102 extending longitudinally of the said drive-shaft. Each of the guide-bars 102 has a sliding fit in a T-shaped groove 103, one of which is formed in the inner adjacent cam-surface 104 of each of four similar gripping-shoes 105.

The drive-shaft 99 is formed with an axial passage 106 in which is adapted to reciprocate an actuating-rod 107. The said actuating-rod projects outwardly beyond the outer end of the drive-shaft 99 and has mounted upon its extreme outer end a control-member 108. The said control-member 108 is rigidly coupled to the actuating-rod 107 by means of a flanged cup-shaped attaching-member 109 which, as indicated in Fig. 12, is threaded onto the outer end of the said actuating-rod and bolted to the outer face of the said control-member.

The control-member 108, like the previously-described control-member 28, tapers inwardly toward the outer end of its drive-shaft which, in this instance, is the drive-shaft 99. In the instance shown, the control-member 108 is provided with four similar outwardly-facing cam-surfaces 110 which slope in a direction lengthwise of the drive-shaft in registration respectively with and in opposition to the slope of the cam-surfaces 100. Each of the cam-surfaces 110 is formed with a T-shaped groove 111 which is in registration with the similar one of the grooves 101 previously described. Each of the grooves 111 receives the inner portion of one of four similar I-shaped guide-bars or -keys 112 (Fig. 12), and each of said guide-bars has a sliding fit in a T-shaped groove 113. There are a total of four T-shaped grooves 113, one of which is formed in the cam-surface 114 forming a feature of the interior of the outer portion of each of the gripping-shoes 105.

About midway of its length and intermediate the respective cam-surfaces 104 and 114 therein, each gripping-shoe 105 is formed with a recess 115 opening inwardly toward the actuating-rod 107 as is especially well shown in Fig. 12. On each of the respective opposite sides of its recess 115, each gripping-shoe 105 is formed with one of two complemental guide-grooves 116—116 extending in the radial direction and in communication with the adjacent recess 115, as is especially well indicated in Figs. 14 and 15.

Figure 14:
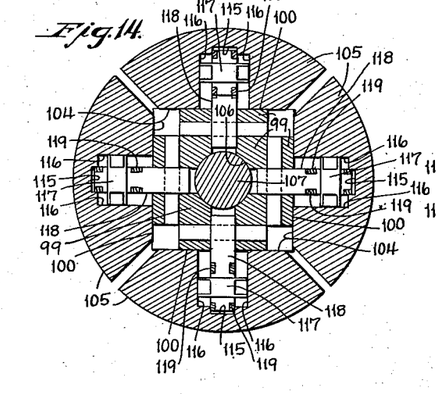
Fig. 14 is a transverse sectional view taken on the line 14—14 of Fig. 12.
Figure 15:
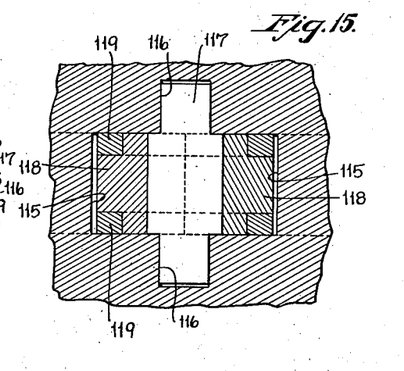
Fig. 15 is a broken enlarged-scale sectional view taken on line 15—15 of Fig. 12.
Figures 16, 17:
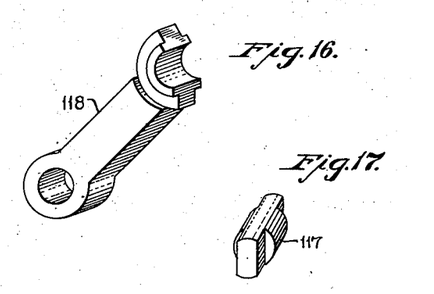
Fig. 16 is a perspective view of one of the two similar toggle-levers, detached.
Fig. 17 is a perspective view of one of the guidepins employed in the structure of Figs. 12 to 16 inclusive.

Extending transversely across each of the recesses 115 and having flattened ends slidable in the guide-grooves 116—116 of each gripping-shoe, is a guide-pin 117 against which bears the outer end of two similar but oppositely-inclined toggle-levers 118—118. For the purpose of connecting the outer ends of the two toggle-levers 118—118 to the guide-pin 117, the outer portions of each of the said toggle-levers are encircled by a pair of retaining-rings 119—119 respectively located adjacent the opposite sides of the adjacent recess 115 and arranged concentrically with respect to the said guide pin.

A given pair of toggle-levers 118—118 diverge from each other inwardly toward the actuating-rod 107 and are pivotally connected to the drive-shaft 99 and the control-member 108 as is especially well shown in Fig. 12.

Now, when it is desired to cause the gripping-shoes 105 to collapse inwardly, the actuating-rod 107 may be forced axially outwardly by any suitable means, to thus move the control-member 108 into substantially the position in which it is indicated by broken lines in Fig. 12. This action will, through the intermediary of the toggle-levers 118—118, serve to move the gripping-shoes 105 also outwardly in an axial direction, but only to a degree substantially one-half of the degree to which the said control-member 108 has been moved. The parts will have now assumed substantially the positions in which they are indicated by broken lines in Fig. 12.

When it is desired to again expand the gripping-shoes 105, the actuating-rod 107 may be moved axially inwardly to thus restore the parts to substantially the positions in which they are indicated by full lines, in Figs. 12 to 15 inclusive.

The showing of Figs. 18 to 22 inclusive

The structure of Figs. 18 to 22 inclusive is basically the same as the structure illustrated in Figs. 1 to 8 inclusive, save that provision is made whereby one of the gripping-shoes is divided longitudinally and is so constructed and arranged that it will serve to grip the in-bent end of a coil or bundle of sheet metal or the like, when the gripping-shoes are expanded. The clamping action referred to will be automatically released when the gripping-shoes are collapsed, all as will be presently described.

Figure 18:
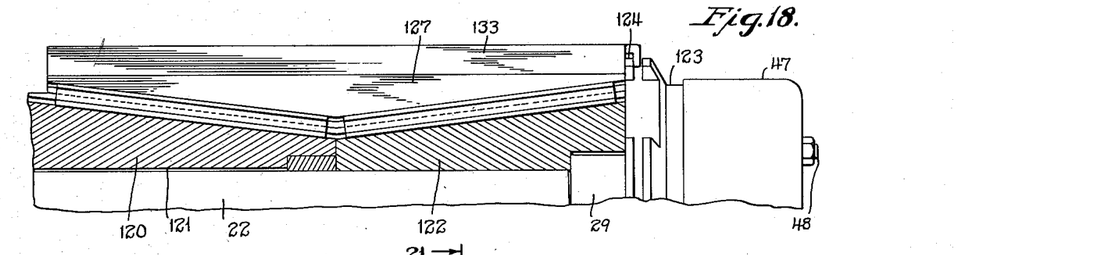
Fig. 18 is a broken view partly in central-longitudinal section and partly in side elevation of a still further form which the present invention may assume and incorporating a gripping-mechanism.

A drive-shaft 120 is employed similar to the drive-shaft 20 previously described, and like the same having an axial passage 121 extending therethrough, as is indicated in Fig. 18. Extending through the passage 121 is an actuating-rod 22 which has previously been described in detail and which has mounted on its projecting outer portion a control-member 122 similar to the control-member 28 previously described. The parts at the outer end of the actuating-rod 22 and outwardly of the control-member 122 are the same as those illustrated in Figs. 1 to 8 inclusive, with the exception that the actuating-head 40 is replaced by an actuating-head 123 having circumferentially spaced-apart coupling-ribs 124 projecting outwardly therefrom, for purposes as will hereinafter appear.

Both the outer end of the drive-shaft 120 and the control-member 122 are provided with sloping cam-surfaces in the same general manner as those previously described in connection with the preceding structures and herein requiring no detailed description other than to note that jointly arranged around them and keyed thereto for relative axial movement are three (more or less) similar gripping-shoes 125 (Fig. 21), and one two-part gripping-shoe assembly generally designated by the reference character 126. The said gripping-shoe assembly is composed mainly of two complemental clamping-members 127 and 128 which, in a manner as will hereinafter appear, are adapted to move laterally toward and away from each other.

The gripping-shoes 125 are keyed to both the drive-shaft 120 and the control-member 122 in the manner previously described and permitting relative axial movement between the said parts. The clamping-member 127 of the gripping-shoe assembly 126 is keyed to and guided for oblique movement with respect to the drive-shaft 120 by means of a guide-bar or -key 129, which diverges away from the center of the drive-shaft 120 as it progresses outwardly toward the outer end of the said drive-shaft, all as is especially well indicated in Figs. 19 and 20. The said clamping-member 127 is also coupled to the control-member 122 for oblique movement with respect thereto by means of a guide-bar or -key 130 also extending obliquely with respect to the center line of the control-member 122 and sloping in a direction opposite to the slope of the guide-bar 129.

Figure 19:
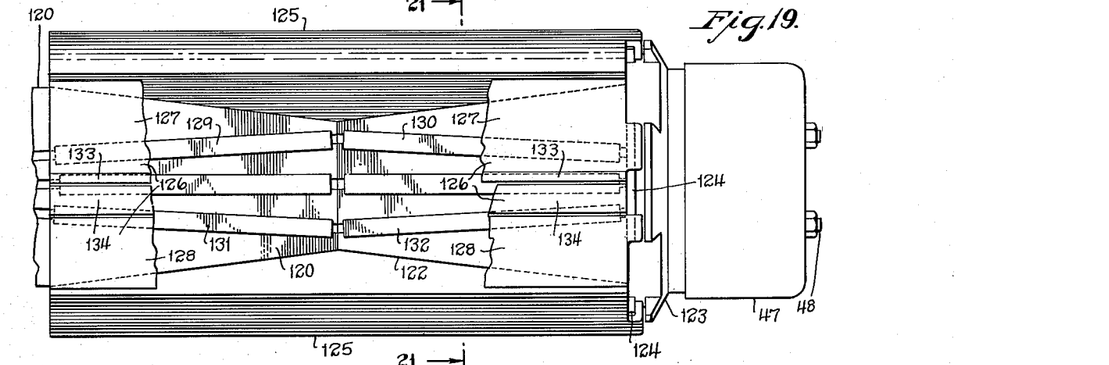
Fig. 19 is a top or plan view of the device illustrated in Fig. 18 with portions of the gripping-shoe assembly broken away and with the said assembly and the companion gripping-shoes in their expanded positions.
Figure 20:
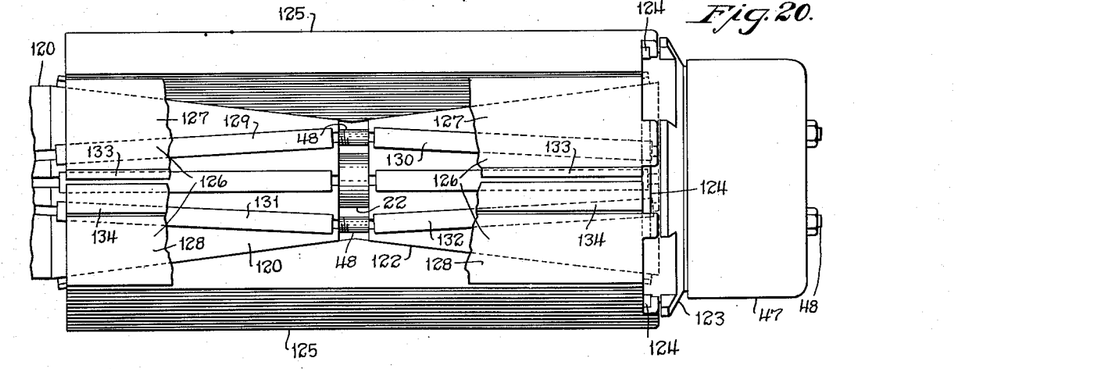
Fig. 20 is a view similar to Fig. 19 but showing the gripping-shoes in their collapsed positions.
Figure 21:
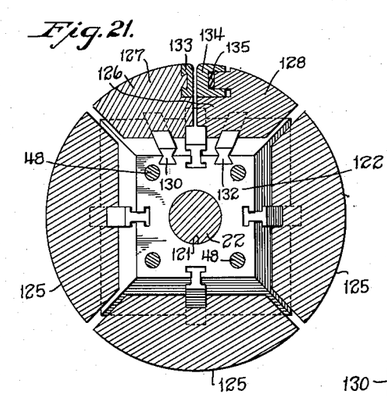
Fig. 21 is a view partly in transverse section on the line 21—21 of Fig. 19 but with the control-member in inner-end elevation.

The companion clamping-member 128 of the gripping-shoe assembly 126 previously referred to is, in turn, keyed to the drive-shaft 120 for oblique movement with respect thereto by means of a guide-bar 131 diverging away from its companion guide-bar 129, as is especially well shown in Figs. 19 and 20. The said clamping-member 128 is also keyed to the control-member 122 for oblique movement relative thereto by a guide-bar or -key 132 obliquely arranged both with respect to the center line of the control-member 122 and its companion guide-bar 130.

Secured to the inner edge of the clamping-member 127 and facing toward the companion clamping-member 128, is a clamping-bar 133 (Fig. 22) which is adapted to cooperate with a companion clamping-bar 134 mounted on the inner face of the clamping-member 128 with capacity for slight lateral movement toward and away from the companion clamping-bar 133. The clamping-bar 134 is, in the instance shown, of U-shaped form in cross section and may be yieldingly urged toward the companion clamping-bar 133 by any suitable yielding-means such, for instance, as a strip 135 of natural or synthetic rubber, or the like.

Figure 22:
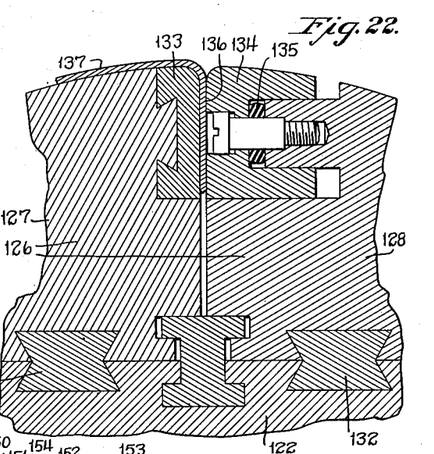
Fig. 22 is a broken enlarged-scale sectional view of the upper portion of Fig. 21.

The complemental clamping-bars 133 and 134 just above referred to are adapted to grip between them the inturned terminal-end 136 of a strip of material 137, as is indicated in Fig. 22.

For purposes of description, it may be assumed that the gripping-shoes 125 and the gripping-shoe assembly 126 are in their expanded positions as indicated in Figs. 18, 19, 21 and 22, in which figures the terminal-end 136 is gripped between the elements 133 and 134. It may be further assumed that it is now desired to collapse the elements 125 and 126. To effect this result, the actuating-rod 22 may be forced axially outwardly by any suitable means, thereby simultaneously moving the control-member 122 outwardly together with the gripping-shoes 125 and the gripping-shoe assembly 126, in the same manner as has been described in detail in connection with the showing of Figs. 1 to 8 inclusive.

The described outward movement of the elements 122, 125 and 126 will cause the elements 125 and 126 to move inwardly toward the central longitudinal axis of the drive-shaft 120, and will simultaneously cause the clamping-members 127 and 128 of the gripping-shoe assembly 126 to separate laterally and thus release the terminal-end 136 of the strip material 137. The separation of the clamping-members 127 and 128 as just described will be caused by the diverging arrangement of the guide-bars 129 and 131 and the similar arrangement of the guide-bars 130 and 132. The parts may now be assumed to have reached the positions in which they are shown in Fig. 20.

Upon the exertion of force upon the actuating-rod 22, so as to move the same inwardly, the parts will be restored to the positions in which they are shown in Figs. 18, 19, 21 and 22, to bring the clamping-bars 133 and 134 together to grip the terminal-end of a strip preparatory to another winding or reeling operation.

*The showing of Figs. 23 to 31 inclusive*

In the preceding structures there have been shown and described tension-winders or reels wherein a plurality of gripping-shoes have been divided from each other in a direction longitudinally of the drive-shaft with which they are associated. In the present instance and as will be later described in detail, the structure embodies a plurality of substantially-annular gripping-shoes.

The structure of Figs. 23 to 31 inclusive includes a drive-shaft 138 which may be driven in any suitable manner and which is provided at its outer end with a cylindrically-contoured portion of slightly-reduced diameter designated by the reference character 139. The said reduced portion 139 is formed in its periphery with a longitudinal groove 140 and is formed in its outer end with three (more or less) coupling-fingers 141 projecting in a direction paralleling the axis of the drive-shaft.

The drive-shaft 138 is formed with an axial passage 142 in which is adapted to reciprocate an actuating-rod 143. Threaded or otherwise rigidly attached to the outer end of the actuating-rod 143, is an actuating-head 144 having three radially-extending coupling-fingers 145 fitting between the coupling-fingers 141 of the drive-shaft 138 as is especially well shown in Fig. 24.

Figure 28:
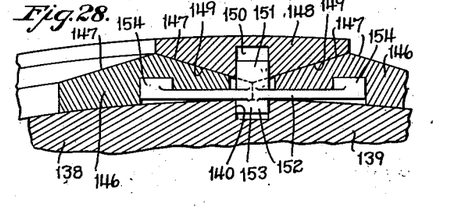
Fig. 28 is a broken detail sectional view taken on the line 28—28 of Fig. 26, but on a larger scale.

Mounted upon the cylindrically-contoured outer portion 139 of the drive-shaft 138, with capacity for sliding movement thereon in an axial direction, is a plurality of control-rings or -members 146, each of which is provided with oppositely-sloping outwardly-facing cam-surfaces 147—147 inclined in a direction lengthwise of the drive-shaft 138 as is especially well shown in Fig. 28.

Figure 23:
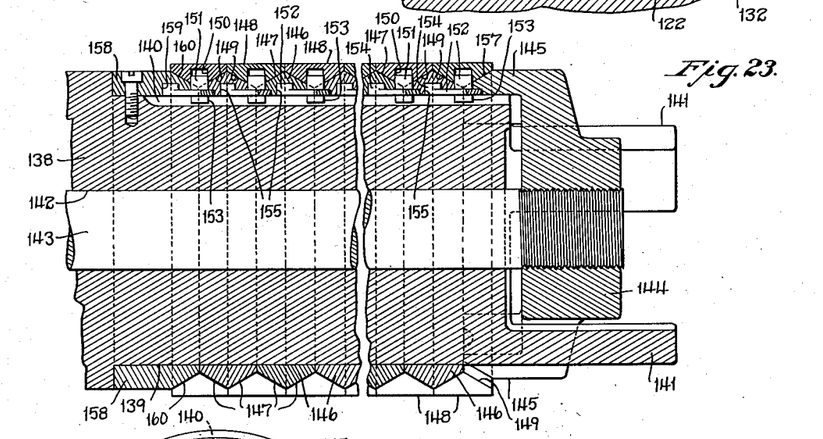
Fig. 23 is a broken view in central-longitudinal section of a still further form which the present invention may assume and showing the gripping-shoes or -rings in their expanded positions.
Figure 24:
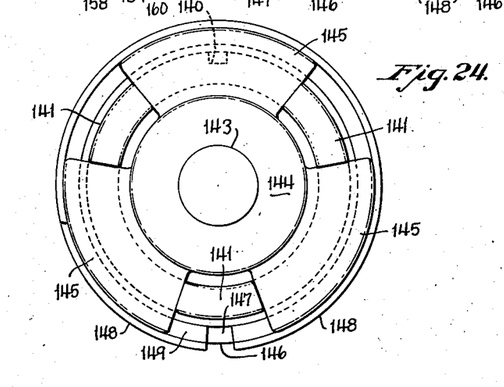
Fig. 24 is a view looking toward the outer end of the showing of Fig. 23.
Figure 25:
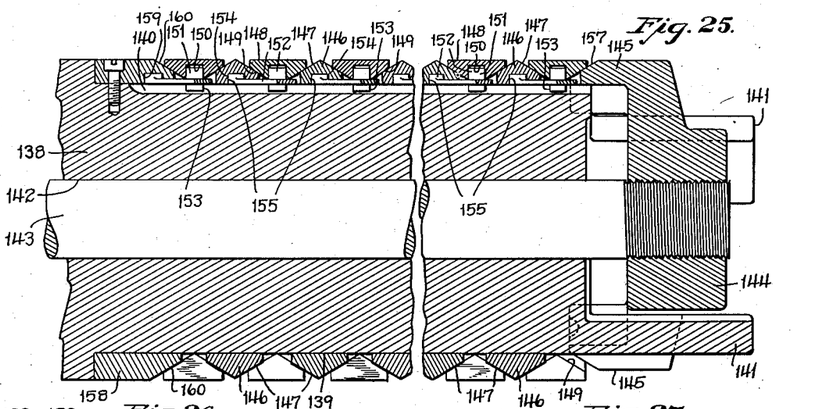
Fig. 25 is a view similar to Fig 23 but showing the gripping-shoes or -rings collapsed.

In turn, encircling the control-rings 146 above referred to, is a plurality of gripping-rings or -shoes which are slightly short of being complete in a circumferential direction (Fig. 24), so as to be able to expand and contract in a radial direction. Each gripping-ring 148 is provided on its inner periphery with two inwardly-facing cam-surfaces 149—149 respectively sloping in opposite directions and substantially conforming to and engaging with the outwardly-facing cam-surface 147 of one control-ring 146 and the oppositely-sloping cam-surface 147 of the next-adjacent control-ring, as is indicated in Figs. 23, 25 and 28.

At a point diametrically opposite its split portion, each gripping-ring 148 is formed with an inwardly-opening cylindrical socket 150 receiving a trunnion 151 projecting outwardly from the central portion of the adjacent one of a plurality of actuating-levers each generally designated by the reference character 152. Axially in line with its outwardly-projecting central trunnion 151, each actuating-lever 152 is also formed with an inwardly-projecting cylindrically-contoured trunnion 153 extending into the longitudinal groove 140 in the drive-shaft 138 with capacity for both turning movement and lateral sliding movement therein. At its respective opposite ends, each actuating-lever 152 is provided with one of two similar cylindrically-contoured and outwardly-projecting trunnions 154—154 for purposes as will hereinafter appear.

Figure 29:
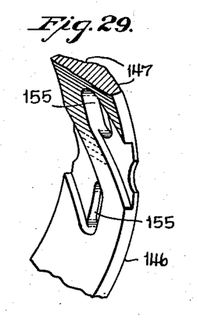
Fig. 29 is a broken perspective view of a fragment of one of the control-rings detached and viewing the same mainly from its inner side.
Figure 30:
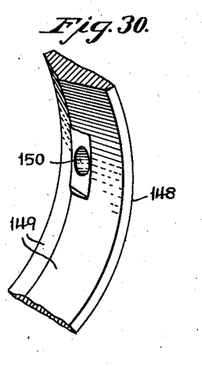
Fig. 30 is a similar view of a fragment of one of the gripping-rings, detached.
Figure 31:
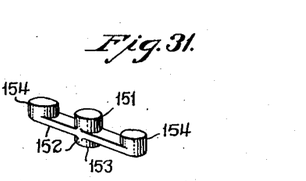
Fig. 31 is a perspective view of one of the actuating-levers, detached.

Returning now to the control-rings 146, each thereof is formed with a pair of inwardly-opening sockets 155—155, each of which is elongated in a direction paralleling the circumference of the control-ring 146 in which it is formed, as is especially well shown in Fig. 29. A given socket 155 in a given control-ring 146 receives one of the trunnions 154 of one actuating-lever 152, while the companion socket 155 receives the adjacent trunnion 154 of another one of the actuating-levers 152, as is especially well shown in Figs. 26 and 27.

Figure 26:
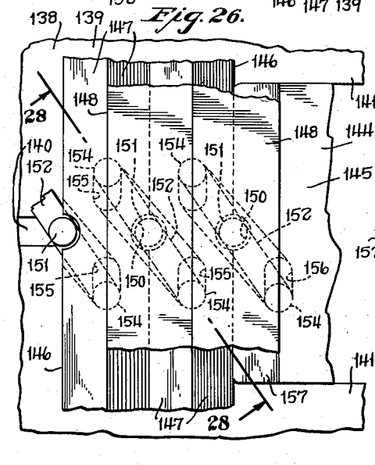
Fig. 26 is a fragmental top or plan view of the outer portion of the structure of Fig. 23 with the gripping-shoes in their expanded positions.
Figure 27:
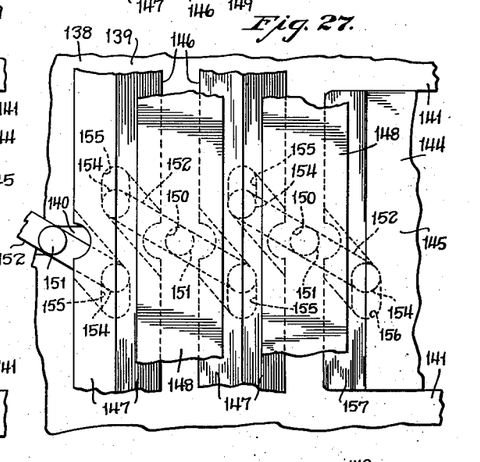
Fig. 27 is a view similar to Fig. 26, but showing the parts in the positions which they assume when the gripping-shoes are collapsed.

As is indicated in Figs. 26 and 27, the actuating-head 144 is formed in the interior of one of its coupling-fingers 145 with a socket 156 elongated in a circumferential direction and similar to the sockets 155 previously described. The said socket 156 receives the adjacent outwardly-projecting trunnion 154 of the outermost one of the actuating-levers 152. The coupling-fingers 145 are also each formed with an inclined cam-surface 157.

Rigidly attached to the innermost end of the reduced portion 139 of the drive-shaft 138, is a ring 158 which is formed interiorly with an inwardly-opening socket 159, as is indicated in Figs. 23 and 25, and corresponding to the sockets 155 and 156 previously described. The said ring 58 is also formed with an inclined cam-surface 160.

Assuming, for purposes of description, that the gripping-rings or -shoes 148 are expanded as is shown in Figs. 23, 24, 26 and 28, an outward axial movement of the actuating-rod 143 will similarly move the actuating-head 144. Since the said actuating-head is coupled by means of its elongated socket 156 and the adjacent one of the trunnions 154 to the outermost actuating-lever 152, the control-rings 146 will (by the action of the actuating-levers 152) be separated from each other in an axial direction, and similarly the split gripping-rings or -shoes 148 will be separated, to bring the parts substantially into the positions in which they are indicated in Figs. 25 and 27. During the operation just referred to, the actuating-levers 152 will tilt around their coaxial trunnions 151 and 153 in a direction more nearly into alignment with the longitudinal axis of the drive-shaft 138. This movement will cause the displacement (in an axial direction) of a given gripping-ring 148 to a degree substantially one-half of the degree to which the contacting control-ring 146 is moved in an axial direction. This proportional movement will be apparent by comparing the showings of Figs. 23 and 25.

*Résumé*

The forms of the present invention selected for illustration in the accompanying drawings are all characterized by a proportional movement of the gripping-shoes, or their equivalent, with respect to the movement of the actuating-members, so that the reliable collapse of the gripping-shoes or their equivalent will be assured to effect the release of a bundle or coil of strip material or the like previously wound under tension on the tension-winder or reel. The proportional movement referred to can be reliably and effectively accomplished by means of the present invention by the reciprocating movement of an actuating-rod or the like.

When employing a plurality of gripping-shoes of the character illustrated in Figs. 1 to 8 inclusive, it is preferred to positively move each of the said gripping-shoes, though it has been found that if one thereof is positively moved in an axial direction, under most circumstances the frictional grip of the coil or bundle of strip material tightly wound upon the tension-winder will serve as a coupling and thus insure the coincident movement of the other of the said gripping-shoes. If desired, such gripping-shoes may obviously be coupled together for coincidental movement in an axial direction.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A collapsible tension-winder for strip material, including in combination: a drive-shaft; a first plurality of outwardly-facing cam-surfaces carried by the said drive-shaft and sloping in a direction lengthwise thereof; a second plurality of outwardly-facing cam-surfaces also carried by the said drive-shaft and sloping in a direction opposite to the slope of the said first plurality of cam-surfaces; a plurality of gripping-shoes jointly providing a coil-receiving outer surface for the said drive-shaft and movable toward and away from the axis of rotation of the latter as well as in an axial direction with respect to both of the said pluralities of cam-surfaces and the said drive-shaft, each of the said gripping-shoes being provided with at least one inwardly-facing cam-surface engageable with and sloping in substantial conformity with at least one of the first plurality of cam-surfaces, and each of the said gripping-shoes also being provided with at least one inwardly-facing cam-surface engageable with and sloping in substantial conformity with at least one of the said second plurality of cam-surfaces; and actuating-means effecting the collapse and expansion of the said gripping-shoes and including a member reciprocating lengthwise of the said drive-shaft, the said actuating-means coincidentally shifting one of the said plurality of cam-surfaces and the said gripping-shoes in an axial direction with respect to the said drive-shaft and constructed and arranged to shift the last-mentioned plurality of cam-surfaces to a greater extent than the said gripping-shoes.

2. A collapsible tension-winder as set forth in claim 1 and in which the said actuating-means also includes at least one actuating-lever operatively interposed between the said reciprocating member and the said gripping-shoes.

3. A collapsible tension-winder as set forth in claim 1 and in which the said actuating-means includes cylinder-means and in which the said reciprocating member of the actuating-means is in the form of a piston operatively associated with the said cylinder-means.

4. A collapsible tension-winder for strip material, including in combination: a drive-shaft having a passage extending longitudinally therethrough; a first plurality of outwardly-facing cam-surfaces carried by the said drive-shaft and sloping in a direction lengthwise thereof; a second plurality of outwardly-facing cam-surfaces also carried by the said drive-shaft and sloping in a direction opposite to the slope of the said first plurality of cam-surfaces; a plurality of gripping-shoes jointly providing a coil-receiving outer surface for the said drive-shaft and movable toward and away from the axis of rotation of the latter as well as in an axial direction with respect to both of the said pluralities of cam-surfaces and the said drive-shaft, each of the said gripping-shoes being provided with at least one inwardly-facing cam-surface engageable with and sloping in substantial conformity with at least one of the first plurality of cam-surfaces, and each of the said gripping-shoes also being provided with at least one inwardly-facing cam-surface engageable with and sloping in substantial conformity with at least one of the said second plurality of cam-surfaces; and actuating-means effecting the collapse and expansion of the said gripping-shoes and including a member reciprocating lengthwise in the longitudinal passage in the said drive-shaft, the said actuating-means coincidentally shifting one of the said plurality of cam-surfaces and the said gripping-shoes in an axial direction with respect to the said drive-shaft and constructed and arranged to shift the last-mentioned plurality of cam-surfaces to a greater extent than the said gripping-shoes.

5. A collapsible tension-winder as set forth in claim 4 and in which the said actuating-means also includes at least one actuating-lever operatively interposed between the said gripping-shoes and the said reciprocating member in the said drive-shaft.

6. A collapsible tension-winder for strip material, including in combination: a drive-shaft; a first plurality of outwardly-facing cam-surfaces carried by the said drive-shaft and sloping in a direction lengthwise thereof; a second plurality of outwardly-facing cam-surfaces also carried by the said drive-shaft and sloping in a direction opposite to the slope of the said first plurality of cam-surfaces; a plurality of gripping-shoes jointly providing a coil-receiving outer surface for the said drive-shaft and movable toward and away from the axis of rotation of the latter as well as in an axial direction with respect to both of the said pluralities of cam-surfaces and the said drive-shaft, each of the said gripping-shoes being provided with at least one inwardly-facing cam-surface engageable with and sloping in substantial conformity with at least one of the first plurality of cam-surfaces, and each of the said gripping-shoes also being provided with at least one inwardly-facing cam-surface engageable with and sloping in substantial conformity with at least one of the said second plurality of cam-surfaces; and actuating-means effecting the collapse and expansion of the said gripping-shoes and including a member reciprocating lengthwise of the said drive-shaft, the said actuating-means being connected to and coincidentally shifting the said first plurality of cam-surfaces and the said gripping-shoes in an axial direction with respect to the said second plurality of cam-surfaces and constructed and arranged to shift the said first plurality of cam-surfaces to a greater extent than the said gripping-shoes.

7. A collapsible tension-winder as set forth in claim 6 and in which the said actuating-means includes at least one actuating-lever operatively connected to both the said gripping-shoes and the said first plurality of cam-surfaces.

8. A collapsible tension-winder as set forth in claim 6 and in which the said actuating-means includes both a cylinder and an associated piston, one of which latter comprises the said reciprocating member of the actuating-means.

9. A collapsible tension-winder for strip material, including in combination: a drive-shaft having a plurality of normally-fixed outwardly-facing cam-surfaces sloping in a direction lengthwise of the said shaft; a control-member carried by the said drive-shaft and movable in an axial direction with respect thereto, the said control-member being provided with a plurality of outwardly-facing cam-surfaces sloping in a direction opposite to the slope of the cam-surfaces of the said drive-shaft; a plurality of gripping-shoes jointly providing a coil-receiving outer surface for the said drive-shaft and movable toward and away from the axis of rotation of the latter as well as in an axial direction with respect to both the cam-surfaces of the said drive-shaft and the cam-surfaces of the said control-member, each of the said gripping-shoes being provided with at least one inwardly-facing cam-surface engageable with and sloping in substantial conformity with at least one of the cam-surfaces of the said drive-shaft, and each of the said gripping-shoes also being provided with at least one inwardly-facing cam-surface engageable with and sloping in substantial conformity with at least one of the cam-surfaces of the said control-member; and actuating-means coincidentally shifting the said control-member and the said gripping-shoes in an axial direction with respect to the said drive-shaft and constructed and arranged to shift the control-member to a greater extent than the said gripping-shoes.

10. A collapsible tension-winder as set forth in claim 9 and in which the said actuating-means includes a plurality of levers each pivotally connected at one end to the said drive-shaft and each pivotally connected intermediate its respective opposite ends to one of the said gripping-shoes.

11. A collapsible tension-winder as set forth in claim 9 and in which the said drive-shaft is provided with a longitudinal passage and in which the said actuating-means includes an actuating-rod reciprocating in the said longitudinal passage and connected to the said control-member, the said actuating-means also including a plurality of levers each pivotally connected at its inner end to the said control-member and at its outer end to the said drive-shaft, each of the said levers being further pivotally connected intermediate its respective opposite ends to one of the said gripping-shoes.

12. A collapsible tension-winder for strip material, including in combination: a drive-shaft having a longitudinal passage therethrough and provided with a plurality of normally-fixed outwardly-facing cam-surfaces sloping in a direction lengthwise of the said drive-shaft; an actuating-rod reciprocating in the longitudinal passage in the said drive-shaft; a control-member connected to the said actuating-rod for being moved in an axial direction thereby with respect to the said drive-shaft, the said control-member being provided with a plurality of outwardly-facing cam-surfaces sloping in a direction opposite to the slope of the cam-surfaces of the said drive-shaft, a plurality of tie-rods attached to and projecting outwardly from the said drive-shaft through the said control-member; a retaining-head carried by the said tie-rods at a location outwardly beyond the said control-member; a plurality of gripping-shoes jointly providing a coil-receiving outer surface for the said drive-shaft and movable toward and away from the axis of rotation of the latter as well as in an axial direction with respect to both the cam-surfaces of the drive-shaft and the cam-surfaces of the said control-member, each of the said gripping-shoes being provided with at least one inwardly-facing cam-surface engageable with and sloping in substantial conformity with at least one of the cam-surfaces of the said driveshaft, and each of the said gripping-shoes also being provided with at least one inwardly-facing cam-surface engageable with and sloping in substantial conformity with at least one of the cam-surfaces of the said control-member; and connecting-means interconnecting the said retaining-head, control-member and gripping-shoes and constructed and arranged to coincidentally shift the said control-member and the said gripping-shoes in an axial direction with respect to the said drive-shaft with the said control-member moving to a greater extent than the said gripping-shoes.

13. A collapsible tension-winder as set forth in claim 12 and in which the said connecting-means includes a plurality of levers each pivotally connected at one end to the said retaining-head and each pivotally connected intermediate its respective opposite ends to one of the said gripping-shoes.

14. A collapsible tension-winder as set forth in claim 12 and in which the said connecting-means includes a plurality of levers each pivotally connected at its outer end to the said retaining-head and at its inner end to the said control-member, each of the said levers being further pivotally connected intermediate its respective opposite ends to one of the said gripping-shoes.

15. A collapsible tension-winder for strip material, including in combination: a drive-shaft; a first plurality of normally-fixed outwardly-facing cam-surfaces carried by the said drive-shaft and sloping in a direction lengthwise thereof; a second plurality of outwardly-facing cam-surfaces also carried by the said drive-shaft and sloping in a direction opposite to the slope of the said first plurality of cam surfaces; a plurality of gripping-shoes jointly providing a coil-receiving outer surface for the said drive-shaft and movable toward and away from the axis of rotation of the latter as well as in an axial direction with respect to both of the said pluralities of cam-surfaces and the said drive-shaft, each of the said gripping-shoes being provided with at least one inwardly-facing cam-surface engageable with and sloping in substantial conformity with at least one of the first plurality of cam-surfaces, and each of the said gripping-shoes also being provided with at least one inwardly-facing cam-surface engageable with and sloping in substantial conformity with at least one of the said second plurality of cam-surfaces; and linking-means effecting the collapse and expansion of the said gripping-shoes and coincidentally shifting the said second plurality of cam-surfaces and the said gripping-shoes in an axial direction with respect to the said first plurality of cam-surfaces and constructed and arranged to shift the said second plurality of cam-surfaces to a greater extent than the said gripping-shoes.

16. A collapsible tension-winder for strip material, including in combination: a drive-shaft; a plurality of control-rings mounted on the said drive-shaft with capacity for axial movement with respect thereto, each of the said control-rings being provided with at least two outwardly-facing cam-surfaces respectively sloping in opposite directions; a plurality of split expansible and contractible gripping-rings also carried by the said drive-shaft and each having at least two inwardly-facing cam-surfaces respectively engaging with the oppositely-sloping cam-surfaces of two adjacent control-rings; and actuating-means operatively connected to the said control-rings and the said gripping-rings and constructed and arranged to coincidentally move the same in an axial direction relative to each other.

17. A collapsible tension-winder for strip material, including in combination: a drive-shaft; a plurality of control-rings mounted on the said drive-shaft with capacity for axial movement with respect thereto, each of the said control-rings being provided with at least two outwardly-facing cam-surfaces respectively sloping in opposite directions; a plurality of split expansible and contractible gripping-rings also carried by the said drive-shaft and each having at least two inwardly-facing cam-surfaces respectively engaging with the oppositely-sloping cam-surfaces of two adjacent control-rings; and actuating-means expanding and contracting the said gripping-rings and including a plurality of actuating-levers each pivoted intermediate its respective opposite ends to one of the said gripping-rings and each pivoted adjacent each of its respective outer ends respectively to one of the two control-rings flanking the given gripping-ring.

TADEUSZ SENDZIMIR.

REFERENCES CITED

The following references are of record in the file of this patent:

UNITED STATES PATENTS

| Number | Name | Date |
| --- | --- | --- |
| 2,351,894 | Allardt | June 20, 1944 |
| 2,352,042 | Vander Linde | June 20, 1944 |
| 2,394,503 | Wilson | Feb. 5, 1946 |